(12) United States Patent
Paradiso et al.

(10) Patent No.: US 12,031,641 B2
(45) Date of Patent: Jul. 9, 2024

(54) SYSTEM AND METHOD FOR MONITORING AND DIAGNOSTICS OF AN ACTUATOR DEVICE FOR ACTUATION OF A VALVE FOR FLUID PIPELINES, AND ACTUATOR DEVICE FORMING PART OF THIS SYSTEM

(71) Applicant: ROTORK FLUID SYSTEMS S.R.L., Porcari (IT)

(72) Inventors: Pier Paolo Paradiso, Porcari (IT); Andrea Bozzelli, Porcari (IT); Luca Doroni, Porcari (IT); Andrea Collatini, Porcari (IT); Nicola Batistoni, Porcari (IT)

(73) Assignee: ROTORK FLUID SYSTEMS S.R.L., Porcari (IT)

( * ) Notice: Subject to any disclaimer, the term of this patent is extended or adjusted under 35 U.S.C. 154(b) by 420 days.

(21) Appl. No.: 17/433,360

(22) PCT Filed: Jan. 31, 2020

(86) PCT No.: PCT/IB2020/050779
§ 371 (c)(1),
(2) Date: Aug. 24, 2021

(87) PCT Pub. No.: WO2020/174298
PCT Pub. Date: Sep. 3, 2020

(65) Prior Publication Data
US 2022/0146016 A1 May 12, 2022

(30) Foreign Application Priority Data

Feb. 25, 2019 (IT) ..................... 102019000002671

(51) Int. Cl.
| F16K 37/00 | (2006.01) |
| F16K 31/163 | (2006.01) |
| F17D 5/00 | (2006.01) |

(52) U.S. Cl.
CPC ...... *F16K 37/0083* (2013.01); *F16K 31/1635* (2013.01); *F17D 5/00* (2013.01)

(58) Field of Classification Search
CPC ............. F16K 37/0083; F16K 31/1635; F16K 37/0041; F17D 5/00; F15B 19/005;
(Continued)

(56) References Cited

U.S. PATENT DOCUMENTS

| 10,273,989 B2* | 4/2019 | Paradiso .............. F16K 31/363 |
| 11,840,826 B1* | 12/2023 | Nackers ............... E02F 9/2296 |
| 2017/0261012 A1* | 9/2017 | Paradiso .............. F15B 15/066 |

FOREIGN PATENT DOCUMENTS

| DE | 19643297 C1 | 3/1998 |
| EP | 2562455 A1 | 2/2013 |

(Continued)

OTHER PUBLICATIONS

A Simulation-Based Digital Twin for Model-Driven Health Monitoring and Predictive Maintenance of an Automotive Braking System; Ryan Magargle, Lee Johnson, Padmesh Mandloi, Peyman Davoudabadi, Omkar Kesarkar, Sivasubramani Krishnaswamy, John Batteh, Anand Pitchaikani; DOI 10.3384/ecp1713235; Proceedings of the 12th International Modelica Conference; May 15-17, 2017, Prague, Czech Republic 35.

(Continued)

*Primary Examiner* — Sisay Yacob
(74) *Attorney, Agent, or Firm* — Dickinson Wright PLLC; Andrew D. Dorisio

(57) ABSTRACT

A monitoring system (500) of an on/off type actuator device (1) for activating a valve for fluid pipelines is described, the actuator device (1) being configured to move a valve member of said valve between a first position and a second position. The actuator device (1) comprises at least one fluid cylinder (6) configured to control a linear movement of an actuator rod (8). The monitoring system (500) comprises a plurality of sensors mounted on the actuator device (1) and configured to detect a plurality of operating parameters of the actuator device, and an electronic processing and control unit (50). The electronic processing and control unit (50) is configured to impart a micro-movement to the valve member, to detect signals indicative of the values of said operating parameters during said micro-movement of the valve member, and as a function of said values of said detected operating parameters to estimate if said actuator device (1) is capable of applying a torque or force value sufficient to make said valve member perform the entire movement from the first position to the second position. The micro-movement is such as to constitute only the start of movement of the movable member of the valve, corresponding only to the (Continued)

overcoming of mechanical clearances and dissipative and deformation effects internal to the actuator (1), and furthermore is such as not to substantially involve any alteration in the flow of fluid controlled by the valve. In this way, it is possible to estimate the state of health of the actuator device (1) without causing variations in the flow of fluid through the aforesaid valve.

18 Claims, 6 Drawing Sheets

(58) Field of Classification Search
CPC .............. F15B 20/00; F15B 2211/6313; F15B 2211/6336; F15B 2211/8636; F15B 2211/87; F15B 2211/8752; F15B 2211/8755
See application file for complete search history.

(56) References Cited

FOREIGN PATENT DOCUMENTS

| | | |
|---|---|---|
| EP | 3029338 A1 | 6/2016 |
| EP | 3527834 A1 | 8/2019 |
| WO | 2014168908 A2 | 10/2014 |
| WO | 2017201429 A1 | 11/2017 |

OTHER PUBLICATIONS

Parametric identification of a servo-hydraulic actuator for real-time hybrid simulation; Yili Qian, Ge Ou, Amin Maghareh, Shirley J. Dyke; Mechanical Systems and Signal Processing; vol. 48, Issues 1-2, Oct. 3, 2014, pp. 260-273.

Models of control valve and actuation system for dynamics analysis of steam turbines; Maddalena Pondini, Valentina Colla, Annamaria Signorini; Applied Energy; vol. 207, Dec. 1, 2017, pp. 208-217.

* cited by examiner

PRIOR ART

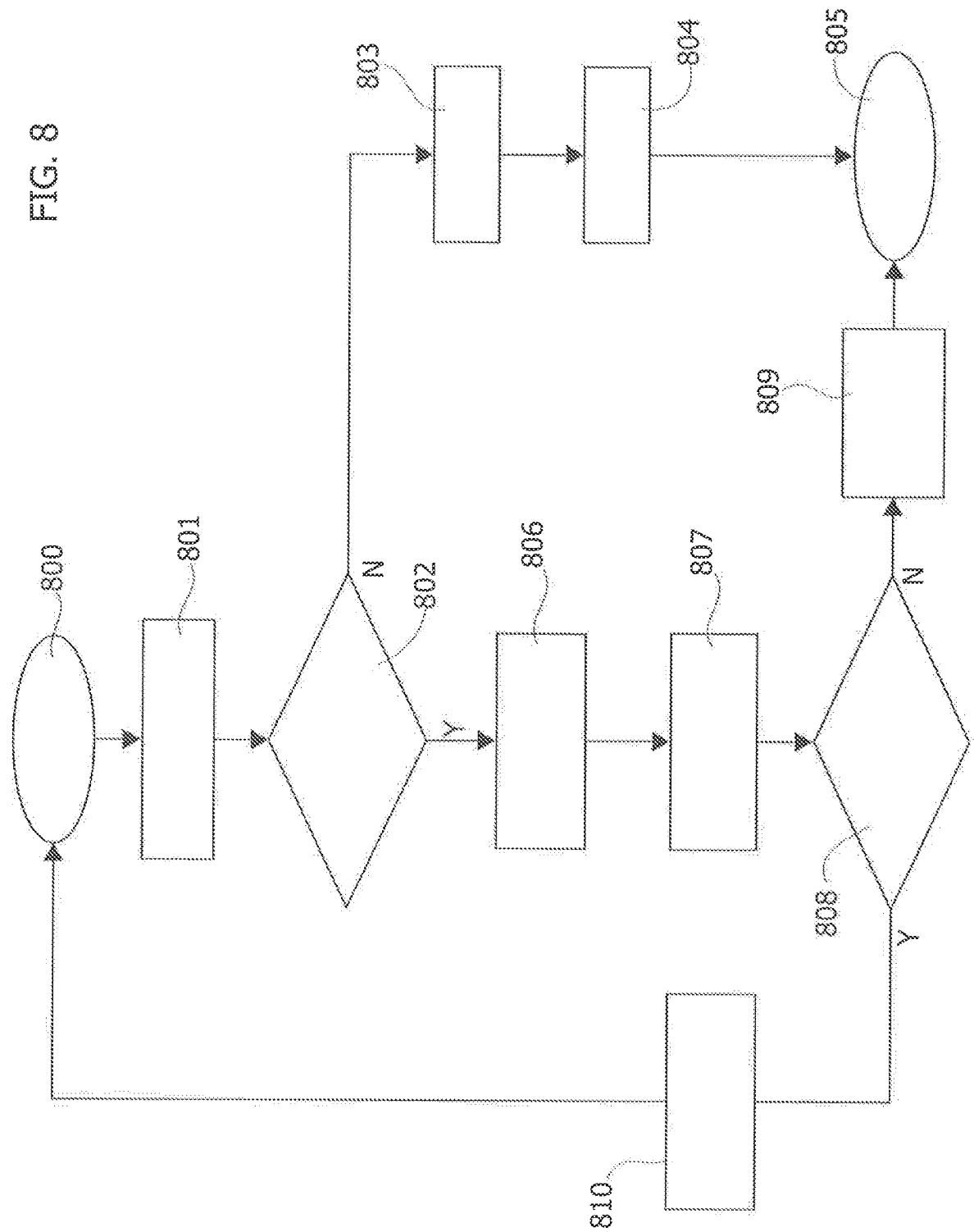

SYSTEM AND METHOD FOR MONITORING AND DIAGNOSTICS OF AN ACTUATOR DEVICE FOR ACTUATION OF A VALVE FOR FLUID PIPELINES, AND ACTUATOR DEVICE FORMING PART OF THIS SYSTEM

FIELD OF THE INVENTION

The present invention relates to monitoring systems of actuator devices for activating various types of valves, for example, relatively large ball valves, butterfly valves or gate valves.

More specifically, the invention relates to a monitoring system of an on/off actuator device for activating a valve for fluid pipelines, wherein the actuator device is configured to move a valve member of the valve between a first position corresponding to a normal operating condition of the valve, and a second position corresponding to an emergency operating condition of the valve, and wherein the actuator device comprises at least one fluid cylinder configured to control a linear movement of an actuator rod.

Actuator devices of the type indicated above have been known and used for some time. Furthermore, monitoring systems have already been proposed for such actuators (see, for example, document WO 2014/168908 A2), which provide a plurality of sensors mounted on the actuator device and configured for detecting a plurality of operating parameters of the actuator device.

PRIOR ART

For the purposes of a better understanding of the invention, an example of an actuator device according to the prior art to which the invention is applicable is described below. It should be noted that the invention would be equally applicable to actuator devices of the same type but having a constructively different structure, or even to actuator devices of any other known type, as will become even more evident below.

Figure 1:
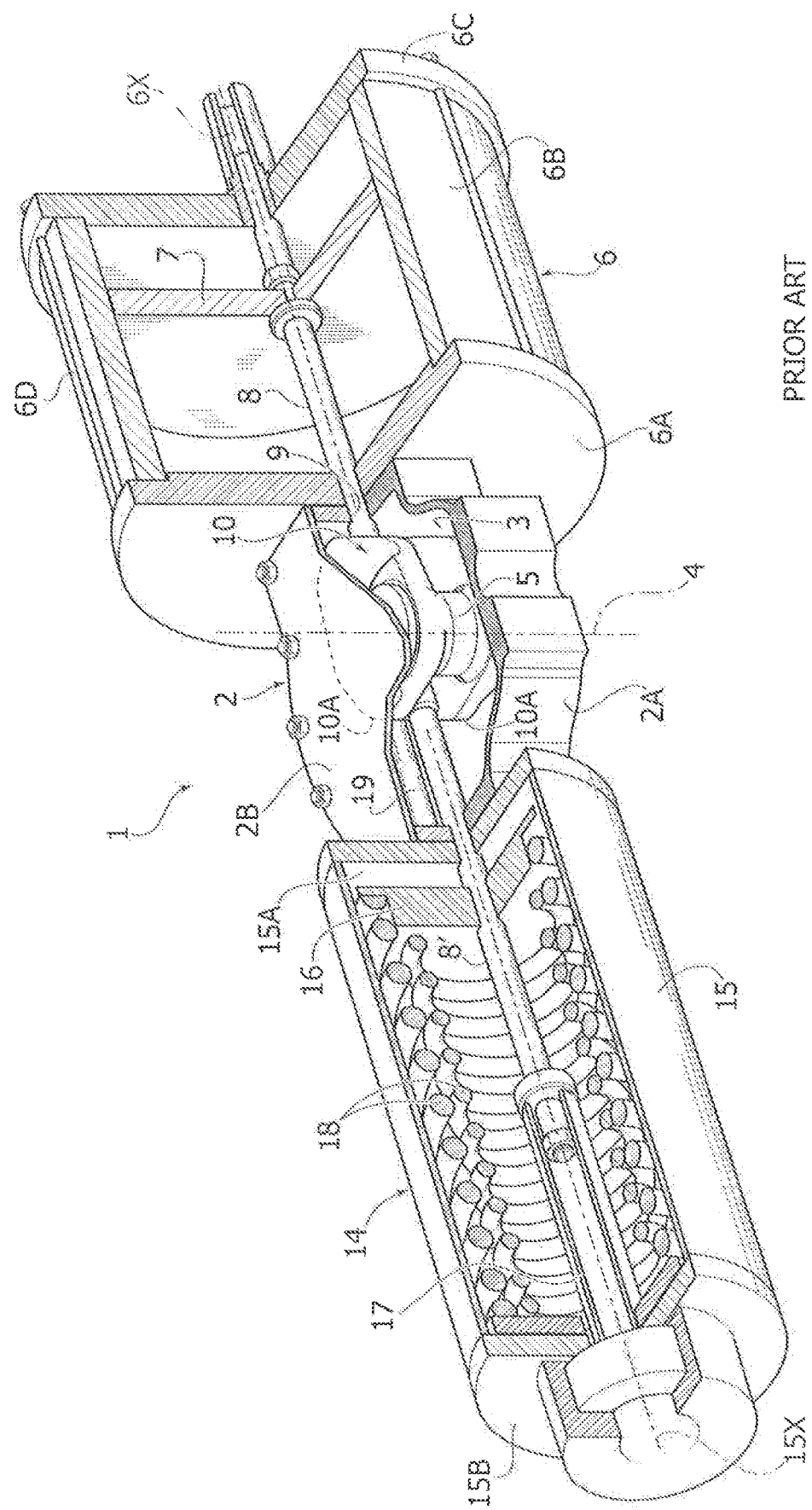

With reference to FIG. 1, numeral 1 indicates—in its entirety—an actuator device for activating valves of various types, for example ball valves or butterfly valves, illustrated in a perspective cross-sectional view.

The actuator device 1 comprises a central supporting body 2, in the form of a metal casing consisting of an element 2A on which a cover 2B is screwed, to define a closed inner cavity 3.

The central supporting body 2 supports an actuator shaft 5 in rotation about a main axis 4. In the specific example illustrated, the actuator shaft 5 is made in the form of a bushing internally grooved to receive therein an actuator rod (not shown) of the movable member of a valve. The bushing constituting the actuator shaft 5 is rotatably mounted within the central supporting body 2 by means of plain or roller bearings of any known type.

The actuator device 1 controls the rotation of the actuator shaft 5, which—in turn—controls the rotation of the movable member of the valve between a first position, for example corresponding to the fully open valve, and a second position, for example corresponding to the completely closed valve. According to a usual technique, the moving part of the valve can be, for example, of the type in which the passage from the open position to the closed position of the valve occurs with a rotation of 90 degrees around the main axis 4.

An end plate 6A of the body of a fluid cylinder 6 intended to control the rotation of the actuator shaft 5 is rigidly connected on one side of the central supporting body 2. The fluid cylinder 6 can be either a hydraulic cylinder or a pneumatic cylinder. The illustrated example refers, in particular, to the case of a pneumatic cylinder. In any case, the fluid cylinder 6 comprises a cylinder body having an axis 6X. The axis 6X of the fluid cylinder 6 and the axis 4 of the actuator shaft 5 are not incident to each other, but are contained in perpendicular planes. The cylinder body is defined by a cylindrical wall 6B closed at one end by the aforesaid end plate 6A and at the opposite end by an end plate 6C. In the illustrated example, the end plates 6A and 6C are clamped against the opposite ends of the cylindrical wall 6B by a plurality of screw tie rods 6D.

A piston 7 is slidably mounted inside the body of the fluid cylinder 6, and is rigidly connected to an actuator rod 8, which is slidably mounted through a central opening of the end plate 6A and through a hole 9 of a side wall of the central supporting body 2. Therefore, the actuator rod 8 extends inside the cavity 3 of the central supporting body 2.

The actuator rod 8 of the fluid cylinder 6 is intended to control the rotation of the actuator shaft 5 by means of a pin-slot transmission, which allows transformation of the linear movement of the actuator rod 8 into a rotation of the actuator shaft 5 around the axis 4.

Figure 2:
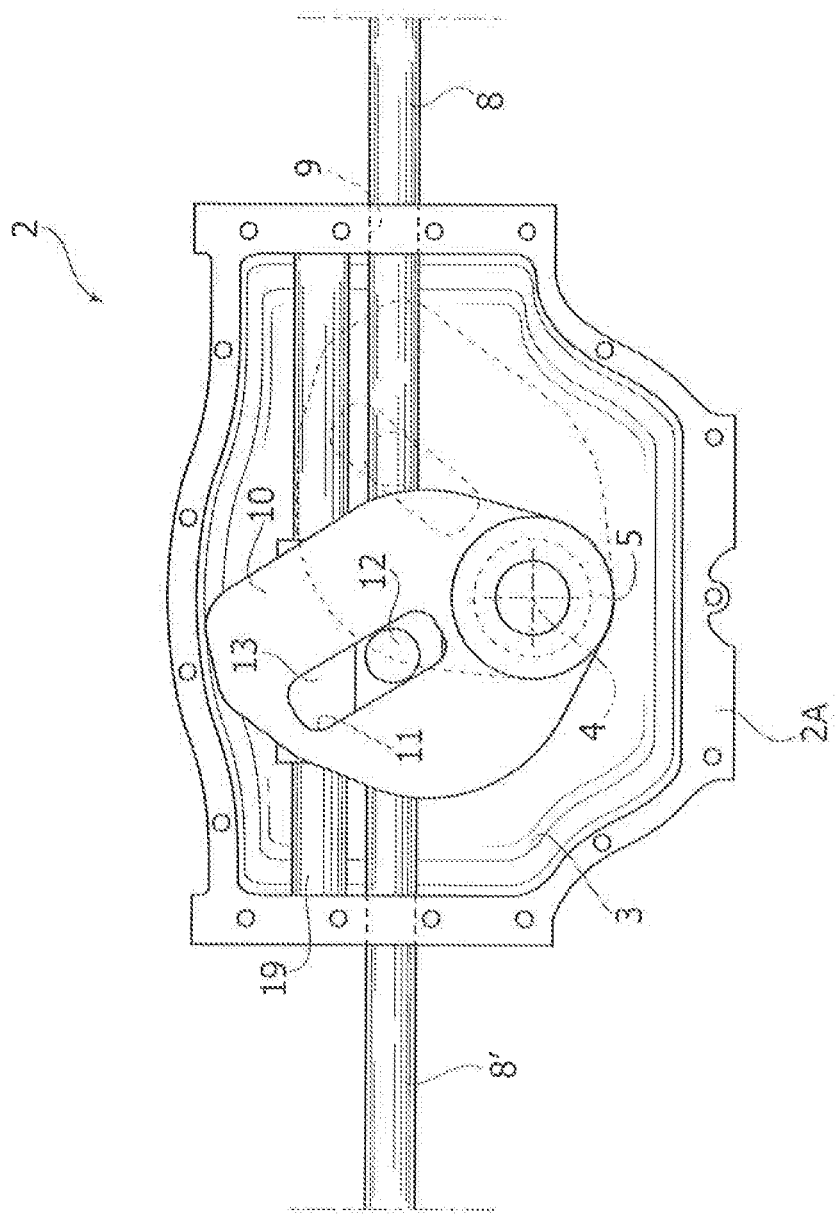

For this purpose, referring to FIG. 2, an actuator arm 10 carrying a cam track in the form of a slot 11 engaged by a cam-follower pin 12 carried by the actuator rod 8 is rigidly connected to the actuator shaft 5.

With reference to the example illustrated in the attached FIGS. 1 to 4, the actuator arm 10 has a yoke shape, with two plates 10A parallel and spaced apart, only one of which is visible in FIG. 2. Still in the particular case of the specific example illustrated, each of the plates 10A has an approximately elongated ellipsoidal conformation, with one end rigidly connected to the actuator shaft 5. The remaining part of the body of each plate 10A has a respective slot 11. The slots 11 provided in the two plates 10A are identical to each other and identically positioned. These slots 11 are engaged by the ends of the cam-follower pin 12, which is carried by a block 13 rigidly connected to the actuator rod 8. The cam-follower pin 12 protrudes on opposite sides of the block 13, to engage both the slots 11 provided in the plates 10A.

As indicated above, the two plates 10A together constitute the actuator arm 10 of the actuator device 1. Engagement of the cam-follower pin 12 within the slots 11 of the plates 10A allows transformation of the linear movement of the actuator rod 8 of the fluid cylinder 6 into a rotation of the actuator shaft 5 which transmits the rotation to the control rod (not shown) of the movable member of the valve, this control rod being coupled inside the bushing constituting the actuator shaft 5.

Of course, the configuration described here for the actuator arm 10 is provided purely by way of example. The actuator arm could have any other configuration, and—in particular—it could consist of a single plate having a single slot engaged by a cam-follower pin carried by the actuator rod of the fluid cylinder.

The slots 11 can also be of any conformation. In particular, the slots may have a straight conformation or may have any non-straight profile to create the required relationship between the axial movement of the actuator rod 8 and the rotation of the actuator shaft 5. The actuator arm may also envisage that each slot is formed in a replaceable insert, removably mounted in the body of the actuator arm, according to what is proposed in the European patent EP 3 029 338 B1 owned by the same Applicant.

With reference again to FIGS. 1 to 4, the actuator device illustrated here purely by way of example also comprises, in a manner known per se, a fail-safe safety device for recalling the actuator arm 10 towards a safety position in the case of a malfunction of the fluid cylinder 6 or of the pneumatic/hydraulic supply system of this fluid cylinder, or if the actuator is required to carry out an emergency operation, for example, an operation that leads to closing the valve to interrupt the flow into the pipeline on which the valve is mounted.

Still with reference to FIG. 1, the fail-safe safety device is indicated—in its entirety—with the reference number 14 and comprises a cylindrical casing 15 having an axis 15X coaxial with the axis 6X of the fluid cylinder 6. The casing 15 of the safety device 14 is rigidly connected at one of its end walls to the central supporting body 2, on the opposite side with respect to the fluid cylinder 6, in such a way that the central supporting body 2 is interposed between the fluid cylinder 6 and the safety device 14. An actuator rod 8', which is arranged on the extension of the actuator rod 8 and which is also connected to the block 13 carrying the cam-follower pin 12, is slidably mounted at an end plate 15A of the casing 15. The actuator rod 8' extends inside the casing 15 and is rigidly connected to a plate 16 movable inside the casing 15. In the case of the illustrated example, the end of the actuator rod 8' located on the opposite side with respect to the block 13 is guided in a sliding manner in a tubular member 17 protruding inside the casing 15 and carried by an end plate 15B which closes the casing 15 on the opposite side with respect to the central supporting body 2. One or more helical springs 18, which tend to recall the actuator rod 8' to the end position corresponding to a safety position of the actuator arm 10, are operatively interposed between the plate 16 and the end plate 15B.

Still with reference to FIGS. 1 to 4, the central supporting body 2 is provided with a guide bar 19 mounted integral therewith and extending in a direction parallel to the axes 6X and 15X of the actuator rods 8 and 8'. The block 13 carrying the pin 12 is guided in a slidable manner on the guide bar 19, for example, by receiving the guide bar 19 within a through-hole which extends through the block 13 in a direction perpendicular to the pin 12. In this way, the pin 12 is constrained to follow an almost straight path parallel to the axes 6X and 15X when the block 13 is moved under the action of the actuator rods 8 or 8'.

As previously discussed, actuator devices for valves equipped with at least one sensor for detecting values of at least one operating parameter of the actuator during its operation are known in the art, in order to allow monitoring of the actuator.

For example, the document WO 2014/168908 A2 already mentioned above describes an actuator for process valves comprising a vibration sensor associated to the actuator, and a process control system that determines the state of health of the actuator according to the values detected by the vibration sensor during normal operation of the actuator.

Technical Problem

Actuator devices as described above with reference to FIGS. 1 to 4—but also linear actuator devices, for activating gate valves—are frequently used as "on/off"-type actuators in critical applications, where they are used to carry out emergency functions (for example, complete closure of a corresponding valve within a pre-established maximum time).

In on/off actuator devices, the actuator:

may typically assume only two positions (e.g., fully open and fully closed), is normally located in one of these two positions (e.g., fully open), and when activated, it performs a safety function by moving into the position opposite to that in which it is normally located (e.g., completing the complete closure of the valve).

With reference to the non-limiting example of FIGS. 1 to 4, the actuator device 1 used as an on/off actuator is normally in the condition in which the fluid cylinder 6 is kept under pressure, with the piston 7 near the end plate 6A, to overcome the force exerted by the spring 18, which is compressed between the end plate 15B and the plate 16 inside the cylindrical casing 15. When an emergency maneuver is required, the fluid cylinder 6 is discharged, in such a way that the force exerted by the spring 18 on the plate 16 exceeds the force exerted in the opposite direction by the fluid cylinder 6 and the resistances to the rotation due to the valve (for example, friction), causing a linear movement of the actuator rods 8 and 8' towards their rest position, which is transformed into a rotation of the actuator shaft 5 corresponding to closure of the valve.

Typically, the frequency with which intervention of the actuator device is required to perform an emergency maneuver is in the order of once a year, or even less. Given the critical nature of the emergency function performed by this type of actuator, the problem arises of guaranteeing a high level of reliability of the actuator device and maintaining this level of reliability over time. The actual ability to perform the emergency maneuver is, however, difficult to diagnose by virtue of the low frequency with which the actuator must intervene. By the very nature of on/off actuators, the possibility of verifying, with high frequency, the actual operation of the actuator during its normal operation is in fact precluded.

Monitoring systems for on/off actuators and for Final Elements are available on the market according to the Functional Safety regulation IEC61508 IEC61511 (or in accordance with ISO13489 or EN62061), in which the health status of the actuator device is controlled by operating the actuator device on a regular basis so as to carry out a macroscopic movement of the valve member associated therewith. For example, if the valve is of the normally open type, the actuator can be controlled, for monitoring purposes, close the valve to at least partially, which obliges the temporary reduction of the flow through the pipeline, with consequent economic losses due to the reduction of the production volumes of the plant, albeit for a limited time; these systems are said to be interfering with the industrial process.

An example of a device which, for the purpose of checking the health of the valve, requires a macroscopic movement of the valve member, is illustrated in the European patent application published as EP 3 527 834 A 1.

The aforementioned document EP 3 527 834 A1 describes a method for determining the operability of a safety valve activated by means of a fluid actuator. The method comprises:

carrying out a partial closing operation ("partial stroke test") of the safety valve, while detecting the pressure of the fluid in the fluid actuator and the position of the safety valve, i.e., its closing percentage, determining a correlation curve between the position of the safety valve and the pressure of the fluid in the fluid actuator, linearly extrapolating the trend of the correlation curve, and determining, based on this extrapolation, a pressure value of the fluid in the fluid actuator corresponding to the safety position of the safety valve.

Therefore, the solution described in EP 3 527 834 A1 also requires moving the valve member, which interferes with the flow of fluid that passes through the pipeline on which the valve is located, causing the disadvantages already listed above.

Furthermore, the known monitoring systems are typically based on an approach in which the good health of the actuator is declared, based on reaching one or more thresholds defined by the operator's experience, if the actuator is able to make the valve member perform a macroscopic but partial movement (e.g., a rotation in the order of 15 degrees to 20 degrees).

In addition, in the event that the actuator is unable to successfully carry out the control maneuver (i.e., the partial macroscopic movement), the known monitoring systems do not provide any indication of the possible causes of the actuator malfunction, thus relying completely on the operator's experience for a possible analysis of the values of the operational parameters detected, and resulting (in the event that anomalies are detected) in long downtimes of the system and complex maintenance procedures, often onerous (e.g., replacement of the entire actuator device).

Object of the Invention

The object of the present invention is to provide a monitoring system of an on/off-type actuator device for activating a valve for fluid pipelines, which allows carrying out a diagnosis of the reliability of the performance of the actuator device with appropriate frequency (for example, a higher cadence than that typically used today in the monitoring of on/off devices) without adversely affecting the industrial process, in particular, without interfering with the flow of fluid that passes through the pipeline on which the valve is located.

Another object of the invention is preferably that of also estimating the time required for the valve member to complete the movement from the open position to the closed position.

SUMMARY OF THE INVENTION

In view of achieving the aforesaid object, the invention relates to a monitoring system of an on/off type actuator device for activating a valve having all the characteristics that are indicated at the beginning of the present description and also characterized in that:

the plurality of sensors mounted on the actuator device comprises at least one pressure sensor for detecting the pressure in the fluid cylinder, a temperature sensor for detecting the temperature in the fluid cylinder, a linear position sensor for detecting the linear position of the actuator rod, and one or more deformation sensors of one or more components of the actuator;

the monitoring system comprises an electronic processing and control unit configured for:

activating the actuator device to cause a micro-movement of the valve member, detecting, by the plurality of sensors, signals indicative of the values of said operating parameters during the micro-movement of the valve member, and as a function of the values of the operating parameters detected during the micro-movement of the valve member, estimating whether the actuator device is capable of applying a torque or force value sufficient to make the valve member perform the entire movement from the first position to the second position, said micro-movement is such as to constitute only the start of movement of the movable member of the valve, corresponding only to the overcoming of mechanical clearances and dissipative and deformation effects internal to the actuator, and furthermore is such as not to substantially involve any alteration in the flow of fluid controlled by the valve; and the steps of detecting the sensor signals and estimating the torque or force value applicable by the actuator device are automatically activated immediately following the execution of the micro-movement.

The invention, therefore, allows to perform a real-time diagnosis of the actuator device with appropriate (even high) frequency without adversely affecting the industrial process, since the diagnostic procedure involves carrying out a micro-movement that does not substantially interfere with the fluid flow controlled by the valve itself.

The electronic processing and control unit can be programmed in any predetermined way in order to use the values of the parameters detected by the aforementioned sensors to provide an indication of the state of health of the system, and in particular the ability of the actuator device to carry out the entire movement of the valve member from the first position to the second position. As illustrated in detail below, a mathematical model that can be used for an evaluation of this type can be constructed with a degree of increasing complexity, depending on the degree of precision to be obtained. In one case of extreme simplification, it is possible, for example, to use any algorithm that links a single operating parameter, such as, for example, the pressure in the actuator cylinder, and the characteristics of the kinematic transmission between the actuator rod and the movable valve member, to the value of torque transmitted to the latter. The use of parametric maps (look-up tables) that provide an indication of the health status of the system according to the parameters detected by the sensors is also not excluded.

In any case, as will be evident from the description that follows, it is important to note that the core of the invention does not reside in any specific estimation method, but in having understood the possibility of carrying out this estimate based on the values of the parameters detected by the aforesaid sensors following a micro-movement of the valve member that constitutes only the start of movement of the movable member of the valve, corresponding only to the overcoming of mechanical clearances and dissipative and deformation effects internal to the actuator, but at the same time such as to avoid substantially causing any alteration in the flow of fluid controlled by the valve.

It will be noted that, in the case of actuator devices of the type exemplified with reference to FIGS. 1 to 4 (so-called "quarter turn"), a micro-movement of the valve member is to be understood as a micro-rotation, and the parameter being estimated can be a torque applied to the valve member.

Alternatively, in the case of linear actuator devices for the movement of "gate"-type valves (to which this invention is equally applicable), a micro-movement of the valve member is to be understood as a micro-translation, and the parameter being estimated can be a force applied to the valve member.

In a preferred embodiment, the electronic processing and control unit is further configured to estimate, according to the values of the operating parameters detected during the micro-movement of the valve member, the time necessary for the valve member to complete the entire movement from the first position to the second position.

In a preferred embodiment, the actuator device is configured to rotate the valve member between the first position and the second position, and comprises an actuator shaft for controlling the rotation of the valve member, and a transmission for transforming the linear movement of the actuator rod into a rotation of the actuator shaft. In this preferred embodiment, the plurality of sensors comprises an angular position sensor to detect the angular position of the actuator shaft.

In another preferred embodiment, the electronic processing and control unit is configured for:
  calculating an applicable torque or force value, which the actuator device is able to apply to the valve member if the actuator device is controlled to make the valve member perform the entire movement from the first position to second position,
  calculating a resisting torque or force value, which is required for the actual movement of the valve member from the first position to the second position,
  comparing said applicable torque or force value with a minimum reference value, and/or comparing said resisting torque or force value with a maximum reference value,
  generating a signal indicative of anomaly of the actuator device if said applicable torque or force value is lower than said minimum reference value, and
  generating a signal indicative of anomaly of the valve if said resisting torque or force value is higher than said maximum reference value.

In a preferred embodiment, the electronic processing and control unit is configured to identify, as a result of the fact that the applicable torque or force value is less than the minimum reference value, at least one component or sub-unit of the actuator device because of which the applicable torque or force value is less than the minimum reference value.

In a preferred embodiment, an electro-pneumatic control unit is associated with the actuator device, and the electronic processing and control unit is configured to identify, as a result of the fact that the applicable torque or force value is less than the minimum reference value, at least one component or sub-unit of the electro-pneumatic control unit because of which the calculated torque value is less than the reference torque value.

Further preferred characteristics and advantages of the invention are indicated in the dependent claims.

DESCRIPTION OF A PREFERRED EMBODIMENT

Figure 5:
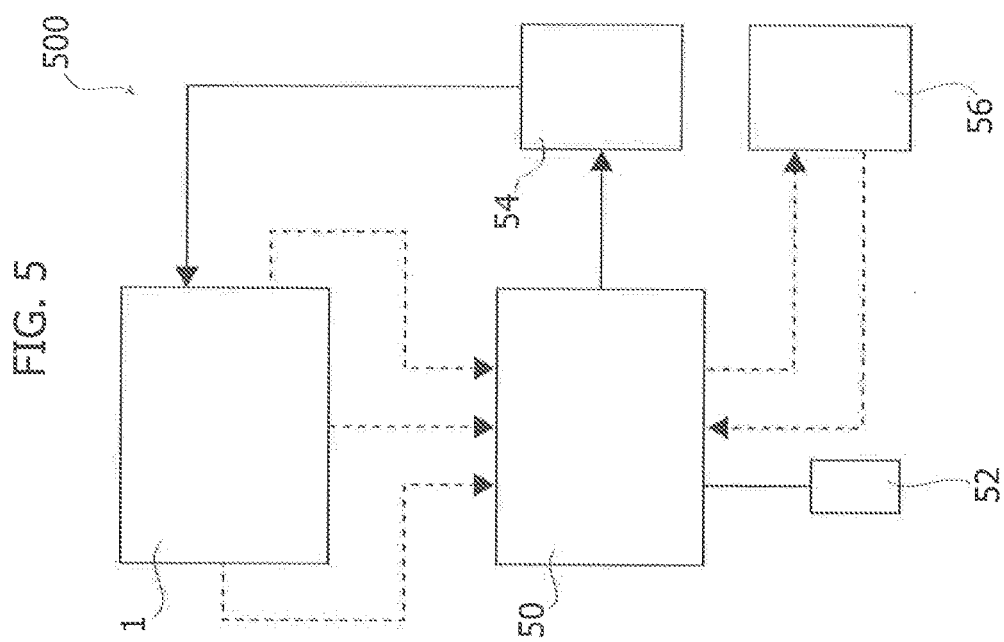
Figure 3:
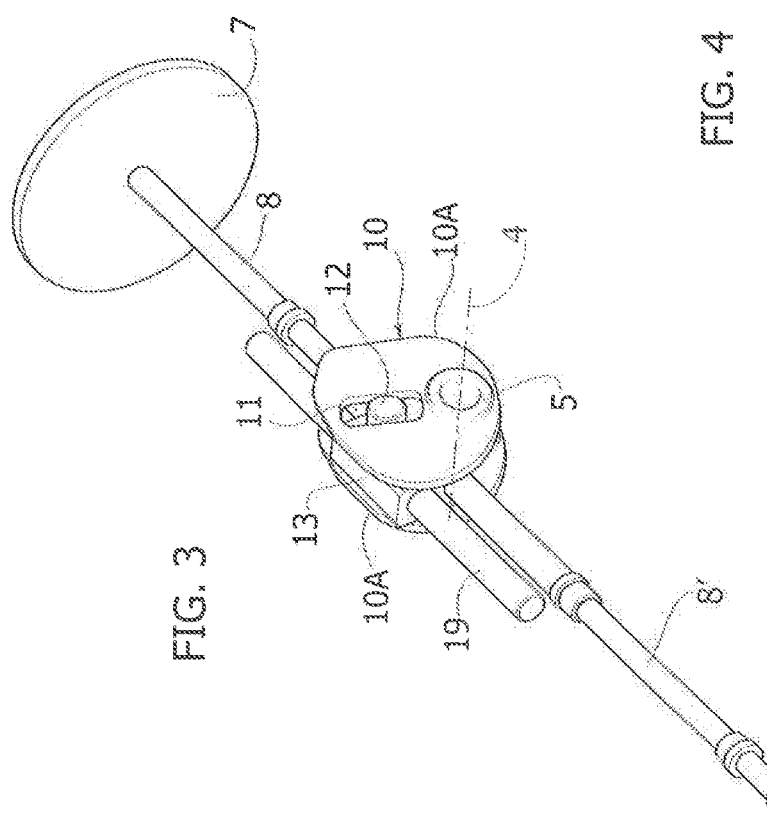
Figure 4:
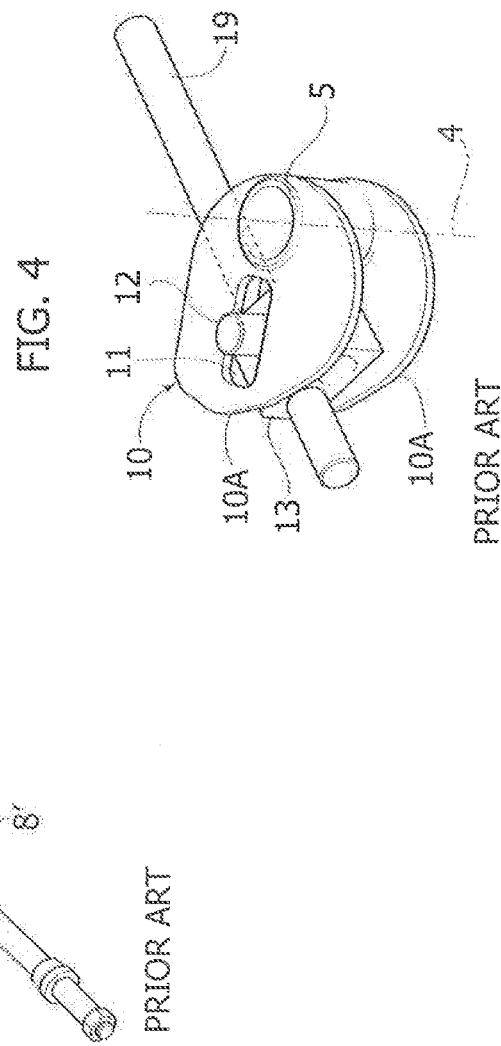
Figure 6:
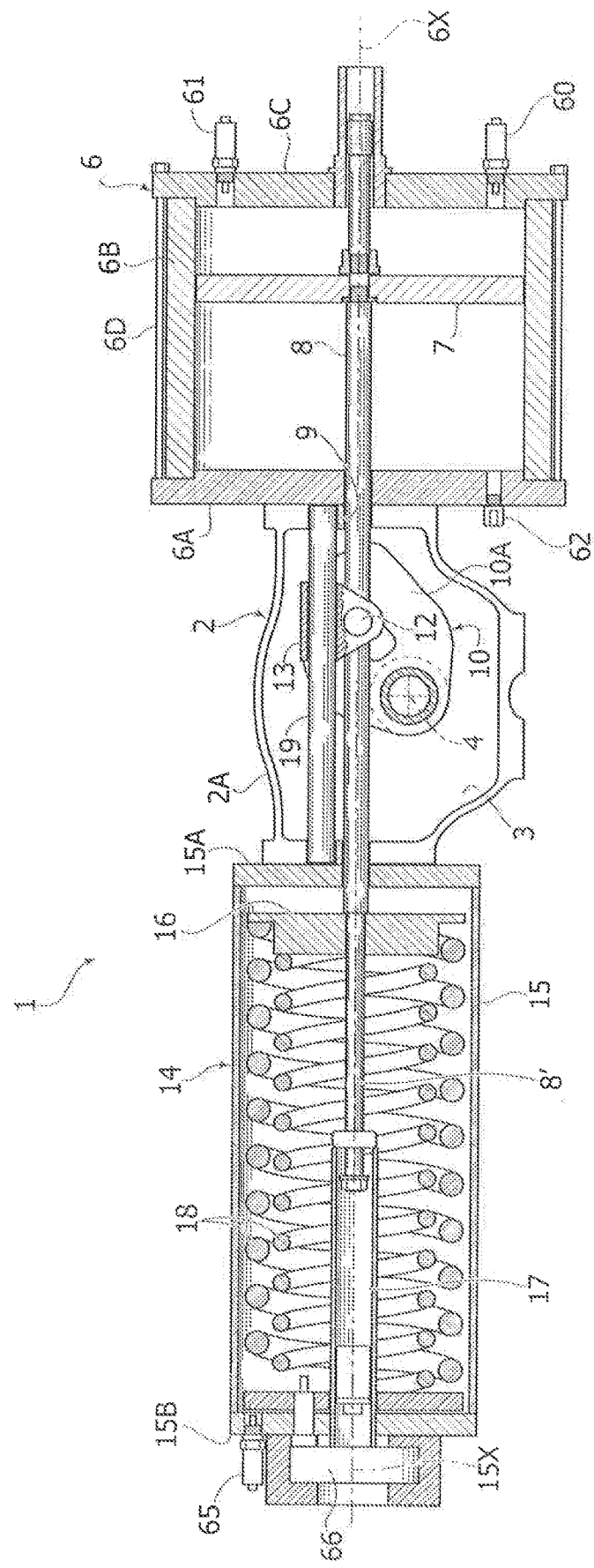
Figure 7:
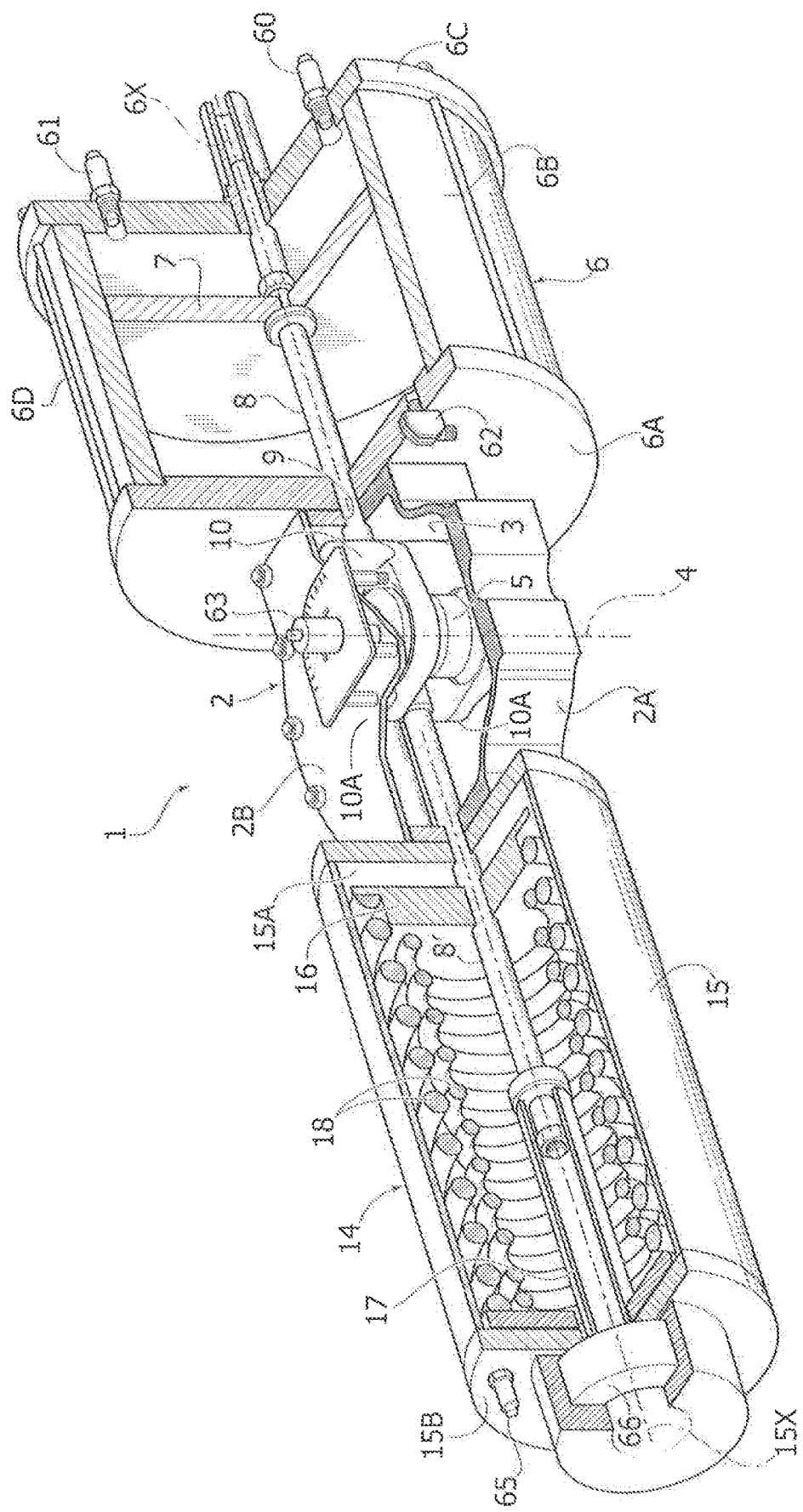

Further characteristics and advantages of the invention will become apparent from the description that follows with reference to the attached drawings, provided purely by way of non-limiting example, wherein:

FIG. 1, already described above, is a cross-sectional perspective view of an actuator device for activating a valve, FIG. 2, already described above, is a cross-sectional view of the central supporting body of the actuator device of FIG. 1, comprising the mechanism for transmitting the motion to the actuator rod of the valve, FIGS. 3 and 4, already described above, are perspective views which illustrate some implementation details of the transmission mechanism of FIG. 2, FIG. 5 is an exemplary block diagram of a monitoring system according to the invention, FIG. 6 is a cross-sectional view of an actuator device according to the invention, FIG. 7 is another cross-sectional view of an actuator device according to the invention, and FIG. 8 is an exemplary flowchart of a method for monitoring an actuator for valves according to the invention.

In the non-limiting example illustrated in FIG. 5, a monitoring system 500 for an on/off actuator device 1 according to the invention comprises:
  a plurality of sensors mounted on the actuator device 1 and configured to detect a plurality of operating parameters of the actuator device 1,
  an electronic processing and control unit 50,
  a human-machine interface device (HMI) 52,
  an electro-pneumatic control unit 54, and
  optionally a remote plant control room 56.

According to the invention, the actuator device 1 can be of the type illustrated with reference to FIGS. 1 to 4, or rather comprising a single-acting fluid cylinder 6 normally active to keep the valve member in a first operating position (typically, completely open) and at least one spring element 18 which tends to move (e.g., rotate) the valve member towards a second safety operating position (typically, completely closed).

In an alternative embodiment, the actuator device 1 can comprise a double-acting fluid cylinder which can be activated in one direction to move (e.g., rotate) the valve member towards its first position, and in an opposite direction to move (e.g., rotate) the valve member towards its second position.

In yet another alternative embodiment, the actuator device 1 may comprise a first single-acting cylinder which can be activated to move (e.g., rotate) the valve member towards its first position, and a second single-acting cylinder can be activated to move (e.g., rotate) the valve member towards its second position.

The electronic processing and control unit 50 is configured to receive, from the plurality of sensors mounted on the actuator device 1, respective signals indicative of the values of the operating parameters detected on the actuator device 1.

Furthermore, the electronic processing and control unit 50 is configured to give the electro-pneumatic control unit 54 the commands necessary for activating the actuator device 1, such as, for example, an opening or closing command (total or partial) of the valve, or a set of commands that initiate and carry out a procedure for diagnosing the state of health of the actuator 1 as better described in the following part of the present description.

The electro-pneumatic control unit 54 comprises a set of electro-pneumatic valves which, controlled by the electronic processing and control unit 50, implement an electro-pneumatic circuit for controlling the fluid cylinder 6.

For example, the electro-pneumatic control unit 54 may comprise:
  an inlet duct for a pressurized fluid (for example, air) with a corresponding inlet filter,
  a pressure regulating device in the inlet duct downstream of the inlet filter,
  a pressure limiting device which performs a safety function by limiting the pressure downstream of the pressure regulating device,
  a (proportional) flow rate regulating device to regulate the introduction of fluid into the fluid cylinder 6, a flow amplifier device downstream of the flow regulator device, which feeds a pneumatic outlet duct coupled to an inlet of the fluid cylinder 6 to control its actuation, and a device for discharging the actuator 1 in emergency conditions.

In the following part of the present description, reference will be made, by way of non-limiting example, to an actuator device as illustrated in FIGS. 1 to 4, i.e. configured to impart rotational movements to the valve member, it being understood that the principles of the present invention are also equally applicable to actuator devices for gate valves.

According to the invention, the electronic processing and control unit 50 is configured to carry out a diagnosis procedure of the actuator 1 that includes:

activating, by means of the electro-pneumatic control unit 54, the actuator device 1 to impart a micro-rotation to the actuator shaft 5 such as not to interfere with the flow of fluid controlled by the valve (possibly, a set or sequence of micro-rotations), detecting, by the plurality of sensors mounted on the actuator 1, signals indicative of the values of the operating parameters during the micro-rotation of the actuator shaft 5, and as a function of the values of said operating parameters detected during said micro-rotation of the actuator shaft 5, estimating whether said actuator device 1 is capable of applying a torque value sufficient to make the valve member perform the entire movement from the first position to the second position.

For example, this estimate can be carried out by:

calculating a torque value that the actuator shaft 5 is able to apply to the valve member in case the actuator device 1 is controlled to make the valve member perform the entire movement from the first position to second position, and comparing the torque value thus calculated with a threshold torque value, which is required for the effective rotation of the valve member from the first position to the second position.

If it is detected that the actuator device 1 is not able to apply a torque value sufficient to make the valve member perform the entire movement from the first position to the second position (for example, because the calculated torque value is less than the threshold torque value), the monitoring system can generate a signal indicating an anomaly.

At the end of the diagnostic procedure described above, and in the event that no anomalies are detected, the electronic processing and control unit 50 can operate the actuator 1 to return the valve member to its normal operating position, if necessary.

In the embodiment exemplified here, the electronic processing and control unit 50 is mounted near the actuator device 1 and is configured to operate (i.e., to receive signals and issue commands) only on this actuator device 1.

Alternatively, the electronic processing and control unit 50 can be connected remotely to the actuator device 1, via a wired or wireless connection. For example, the electronic processing and control unit 50 can be located in the remote plant control room 56. In a still alternative embodiment, a single remote electronic processing and control unit 50 can be associated with a plurality of actuator devices 1 within a certain production plant.

In the case in which a single electronic processing and control unit 50 is associated with a plurality of actuator devices, the unit 50 can be configured to cyclically perform ("in rotation") a diagnostic procedure on all the actuators associated therewith, or on a subset of them.

The human-machine interface device 52 associated with the electronic processing and control unit 50, in addition to providing the information and commands typically available for managing the actuators of a known type (for example: operating the actuator device to impart a partial rotation to the actuator shaft, and/or activating the actuator device to move the valve member from the first position to the second position), is configured for:

communicating the values of the operating parameters detected on a respective actuator device 1 to an operator, providing a command to activate the actuator device 1 in order to carry out the diagnostic procedure described above, and communicating an alarm message corresponding to a signal indicative of anomaly generated in the event that the torque value that the actuator shaft 5 is able to apply to the valve member is less than a torque value required for the effective rotation of the valve from its first position to its second position.

The human-machine interface device 52 can be local, i.e. mounted near the actuator device 1 and accessible to an operator on the field, or remote (i.e., coupled to the electronic processing and control unit 50 via a wired or wireless connection) and located, for example, in the remote control room 56. The human-machine interface device 52 may also comprise a portable device such as a smartphone or tablet. Obviously, these interface devices are not mutually exclusive, and a certain actuator device 1 can be accessible both via a local interface device and via a remote interface device.

In addition, a single remote interface device 52 may allow access (i.e., receiving data and/or sending commands) to a plurality of actuator devices 1, located for example, within the same production plant. In the non-limiting example illustrated in FIGS. 6 and 7, the plurality of sensors mounted on the actuator device 1 comprises at least one of:

a pressure sensor 60 for detecting the pressure in the fluid cylinder 6, a temperature sensor 61 for detecting the temperature in the fluid cylinder 6, a linear position sensor 62 for detecting the linear position of the actuator rod 8, an angular position sensor 63 to detect the angular position of the actuator shaft 5, a deformation sensor to detect deformation of one or more components of the actuator, a temperature sensor 65 for detecting the temperature at the spring element 18, and a load cell sensor 66 to detect a force exerted by the spring element 18 on the actuator rod 8'.

Each of the aforesaid sensors can be implemented according to any known technology. For example, temperature sensors may consist of thermocouples and position/deformation sensors may consist of laser sensors configured to detect the distance between the sensor and the controlled element.

In a preferred embodiment, the electronic processing and control unit 50 is further configured to estimate the time necessary for the valve member to complete the entire movement from the first position to the second position.

In a preferred embodiment, the electronic processing and control unit 50 is configured for:

calculating an applicable torque or force value, which the actuator device 1 is able to apply to the valve member in case the actuator device is controlled to make the valve member perform the entire movement from the first position to second position, and calculating a resisting torque or force value, which is required for the actual movement of the valve member from the first position to the second position.

For example, calculating the applicable torque and the resisting torque can be carried out by determining a correlation between the values of the operating parameters detected during the micro-rotation of the actuator shaft 5 and values of the operating parameters that would be detected during a rotation imparted to the shaft actuator 5 for rotating the valve member from its first position to its second position.

In general, the diagnosis can be made by comparing the torque applicable by the actuator during the emergency maneuver with the resisting torque.

In a preferred embodiment, in the case in which the applicable torque value is lower than the resisting torque, the electronic processing and control unit 50 is configured to determine whether an increase in the dissipation sources internal to the actuator 1 has occurred (e.g., an increase in the friction of the seals, the initiation of mechanical clearances due to wear, the decrease in the thrust of the spring 18, etc.) which represents the cause of the non-satisfaction of the required performance, or if there has been no deterioration in the performance of the actuator 1, but a progressive increase in the resisting torque required by the valve has been detected, which is attributable to the non-satisfaction of the required performance.

Therefore, in a preferred embodiment the electronic processing and control unit 50 is configured for:
- comparing the applicable torque value to a minimum reference value, and/or comparing the resisting torque value to a maximum reference value,
- generating a signal indicative of anomaly of the actuator device 1 if the applicable torque value is lower than the minimum reference value, and
- generating a signal indicative of anomaly of the valve if the resisting torque value is higher than the maximum reference value.

In the case in which there has been an increase in the dissipation sources internal to the actuator 1 (i.e., in the case in which the applicable torque value is less than the minimum reference value), the electronic processing and control unit 50 can be configured to identify which of the main sub-systems of the actuator 1 (i.e., the fluid cylinder 6, the spring actuator unit 14 or the motion transmission mechanism contained in the supporting body 2) causes the performance of the actuator to decrease (i.e., a decrease in the actual deliverable torque).

As described previously, an electro-pneumatic control unit 54 may be associated with said actuator device 1. Therefore, in another preferred embodiment, the electronic processing and control unit 50 is configured to identify, as a result of the fact that the torque value applicable by the actuator shaft 5 is less than the minimum reference value, at least one component or sub-unit of the electro-pneumatic control unit 54 due to which the torque value applicable by the actuator shaft 5 to the valve member is lower than the minimum reference value, possibly discriminating whether the actuator device 1 or the electro-pneumatic control unit 54 causes this anomaly.

Of course, the monitoring system according to the invention can also allow maintenance operations to be carried out based on a continuous detection of the values of one or more operating parameters of the actuator 1, for example, to detect the occurrence of wear phenomena which do not affect the emergency function of the actuator. For example, the monitoring system can be configured to:
- continuously detect the values of one or more operating parameters of the actuator 1 and/or the respective variations (for example, taking advantage of the excitation of the mechanical system induced by any line vibrations, or by any changes in the ambient temperature, however without the need to introduce a disturbance of the static/dynamic state of the actuator such as a micro-rotation),
- carry out a self-diagnosis of the monitoring system, for example, by checking the health of the sensors and the communication system, and/or
- monitor the time evolution of the values assumed by one or more controlled parameters (for example, in order to detect drift errors).

A monitoring method according to the invention is exemplified in the flow chart of FIG. 8.

After a start step 800, at a step 801, the monitoring system imparts a command to the actuator device 1 to perform a micro-movement and starts detecting the values of the operating parameters.

At a step 802, the monitoring system checks, according to the values detected, whether there has been a transition from static conditions to dynamic conditions of the movable member of the valve, that is, if the actuation command given is sufficient to set in motion the movable member of the valve.

In the case of a negative outcome (N) of the verification step 802, indicative of the fact that the actuation command imparted has—at most—generated elastic deformations in the kinematic chain of the actuator device, without generating an effective movement of the movable member of the valve, at a step 803 the monitoring system processes the acquired data and, at a step 804, generates an anomaly signal, indicating, for example, which unit, sub-unit or sensor of the actuator device 1 is the cause of the anomaly detected. The monitoring method then ends at an end step 805.

In the event of a positive outcome (Y) of the verification step 802, indicative of the fact that the actuation command imparted has generated an effective micro-movement of the movable member of the valve, at a step 806 the monitoring system processes the acquired data, for example, by making a predictive estimate of at least one of:
- a torque or force value that the actuator device 1 is able to apply to the valve member when the actuator device 1 will have to move the valve member from the first position to the second position,
- a resisting torque or force value of the movable member of the valve, and
- a speed or angular speed value with which the actuator device 1 will move the valve member from the first position to the second position.

At a step 807, the monitoring system generates a status signal indicative of the fact that the diagnosis procedure can be carried out correctly.

At a step 808, the monitoring system verifies whether the estimated torque or force value applicable by the actuator device 1 to the valve member is greater than a torque or force value required for the effective movement of the valve member from the first position to the second position (resisting torque or force), and optionally checks whether the speed or angular speed value with which the actuator device 1 will move the valve member from the first position to the second position is greater than a reference speed or reference angular speed value.

In the event of a negative outcome (N) of the verification step 808, at a step 809 the monitoring system generates an anomaly signal, and the monitoring method ends at an end step 805.

In the event of a positive outcome (Y) of the verification step 808, at a step 810 the monitoring system generates a positive status signal, indicative of the fact that the actuator device 1 can carry out the emergency maneuver when required, and the monitoring procedure restarts from the beginning step 800, for example, to repeat the monitoring procedure at regular time intervals.

Definition of Micro-Movement, Micro-Rotation, Micro-Translation

In the context of the present description, the term "micro-movement" of the valve member (or rather, a micro-rotation of the actuator shaft 5 in the case of "quarter-turn" actuator devices, such as that exemplified in FIGS. 1 to 4, or a micro-translation in the case of linear actuator devices) indicates a movement sufficiently large to effectively set in motion the movable member of the valve (considering the presence of mechanical clearances and dissipative and deformation effects inside the actuator, such that a small linear movement of the actuator rods 8 and 8' does not necessarily correspond to an effective movement of the movable member of the valve), but also small enough not to interfere in a perceptible way with the fluid dynamic characteristics of the valve (for example, leaving the flow rate of the pipeline at the valve substantially unaltered). It is therefore only the "start" of movement of the movable member of the valve, corresponding to the overcoming of mechanical clearances and dissipative and deformation effects internal to the actuator, such as not to substantially involve any alteration in the flow of fluid controlled by the valve. By this it must be understood that the aforesaid micro-movement, on the one hand, does not entail any significant, or noteworthy variation in the flow of fluid controlled by the valve, and on the other hand, it safeguards the reliability of the valve, since each opening/closing maneuver of the valve can lead to an accumulation of impurities between the valve member and the valve body.

Predictive Mathematical Model

In one example, the electronic processing and control unit 50 can be configured to calculate—according to the values of the operating parameters detected during a micro-movement of the valve member—the torque value that the actuator shaft 5 is able to apply to the valve member, by means of a mathematical model of the specific actuator 1, which can be stored in a memory of the processing and control unit 50.

In the event that a single electronic processing and control unit 50 is associated with a plurality of actuator devices, the electronic processing and control unit 50 can store a plurality of respective mathematical models of the actuator devices, for example, by associating a respective mathematical model with each actuator device, or by dividing the plurality of actuator devices into subsets (for example, with each subset comprising a certain number of similar actuators) and associating a respective mathematical model with each subset thus identified.

The inventors have noted that, in order to estimate the ability of the actuator device 1 to perform an emergency maneuver (i.e., estimate the performance of the actuator), it is useful to estimate the torque that the actuator can deliver at a given angular speed. This angular speed is determined by the maximum time allowed (predetermined) to rotate the movable member of the valve by about 90 degrees. In fact, the inventors have noted that the dynamic effects are not negligible.

With reference to a conventional actuator device 1, as illustrated in FIGS. 1 to 4, it is possible to study in detail the behavior of the various parts of the actuator and the possible consequences of a relative failure on the overall behavior of the actuator, for example, in terms of deliverable torque. Obviously, the same approach can also be applied, in various embodiments of the present invention, to linear actuators, estimating the possible consequences of a failure in terms of deliverable force or thrust.

A mathematical model that describes the behavior of an actuator device 1 for the purposes of the present invention can be determined according to different methodologies.

For example, the document "*Models of control valve and actuation system for dynamics analysis of steam turbines*", M. Pondini, V. Colla, A. Signorini, Applied Energy 207 (2017), p. 208-217, doi: 10.1016/j.apenergy.2017.05.117, and the document "*Parametric identification of a servo-hydraulic actuator for real-time hybrid simulation*", Y. Qian, G. Ou, A. Maghareh, S. J. Dyke, Mechanical Systems and Signal Processing 48 (2014), p. 260-273, doi: 10.1016/j.ymssp.2014.03.001, are examples of possible approaches to mathematical modeling and simulation of hydraulic actuator devices.

In addition to, or alternatively, a mathematical model of an actuator device 1 may also be determined using the "digital twin" technique. In this context, the document *A Simulation-Based Digital Twin for Model-Driven Health Monitoring and Predictive Maintenance of an Automotive Braking System*", R. Magargle, L. Johnson, P. Mandloi, P. Davoudabadi, O. Kesarkar, S. Krishnaswamy, J. Batteh, A. Pitchaikani, Proceedings of the 12th International Modelica Conference, May 15-17, 2017, Prague, Czech Republic, p. 35-46, doi: 10.3384/ecp1713235 is an example of a "digital twin" modeling method of complex mechanical and hydraulic systems.

By way of example, the actuator device 1 of the example considered here can be conceptually divided into three main sub-systems, corresponding to the fluid cylinder 6, to the spring actuator unit 14 and to the pin-slot transmission mechanism contained in the supporting body 2.

Preferably, by means of a Failure Modes, Effect and Diagnostic Analysis (FMEDA), each of these three sub-systems can be further divided into a set of corresponding components (for example, within the pin-slot transmission mechanism it is possible to identify the actuator arm 10, the cam-follower pin 12, the block 13, the guide bar 19, and other components). It is then possible to analyze the possible failure modes of each of these components or sub-units (for example, sets of components), determining the effect they have on the behavior of the actuator as a whole (for example, in terms of variations of the torque delivered). The mathematical model can, therefore, allow characterization of the actuator device 1 at the level of sub-units or components.

Therefore, the inventors have noted that, from a maintenance point of view, it is useful to identify some operating parameters of the actuator device 1, indicative of the health status of one or more components or sub-units of the actuator 1, to be monitored by means of a plurality of sensors in order to evaluate the ability of the actuator to carry out an emergency maneuver in a certain defined time interval.

Generating the mathematical model of an actuator device 1 can be based on the following considerations, which take into account: deformability of the mechanical bodies in the actuator 1, effect of dynamic loads, dynamic response of the mechanical and electro-pneumatic systems, and real fluid-dynamic behavior.

To generate torque, an actuator device as exemplified in FIGS. 1 to 4 (with scotch-yoke architecture and single-acting cylinder) transforms the force generated by the fluid cylinder 6 and the spring element 18. This torque varies according to the angular position of the scotch-yoke kinematic mechanism, i.e., of the actuator arm 10. The module of the torque is a function of the "Gain" parameter of the kinematic mechanism, which amplifies the force.

When the actuator device 1 is required to perform an emergency maneuver, a depressurization of the fluid cylinder 6 is carried out such as to produce a reduction in the force of the piston ($F_{piston}$) sufficient to generate, at the specific angular position (θ) of the actuator arm 10, a difference between the force generated by the spring 18 ($F_{spring}$) and the resistance to rotation generated by the valve (for example, due to friction phenomena), equal to Δforce.

The component Δforce can be decomposed in the directions of interest, or rather in a first direction perpendicular to the axes 6X and 15X, and in a second direction perpendicular to the straight line tangent to the contact profile. The contact profile is a curve that depends on the geometry of the slots 11 formed in the actuator arm 10, and the direction perpendicular to this profile varies according to the angular position θ of the actuator arm 10. In the direction perpendicular to the axes 6X and 15X, a force is generated which is balanced by a reaction force ($F_{reaction}$) in first approximation totally attributable to the guide bar 19. In the direction perpendicular to the contact profile, a force $F_{resultant}$ is generated.

Having identified the direction of the actuator arm 10 (i.e., the direction given by a straight line passing through the pin 12 and the rotation axis 4), it is possible to decompose $F_{resultant}$ into a component perpendicular to the direction of the arm (Arm) and into a component parallel thereto, determining the force ($F_{torque}$) that generates an ideal torque (neglecting internal dissipations) $Torque_{ideal}$ equal to: $Torque_{ideal} = F_{torque} \times Arm$, where Arm is the distance between the pin 12 and the rotation axis 4 which assumes different values as a function of the angular position of the actuator arm 10.

The transmission mechanism therefore produces a "multiplication" of the force that contributes to the development of torque from Δforce to $F_{torque}$, whose ratio represents the "Gain" parameter, therefore a function of the angular position θ of the actuator arm 10.

The developed torque can be calculated by applying an efficiency coefficient η to the ideal torque $Torque_{ideal}$, which takes into account the dissipations (in friction) internal to the actuator, estimated experimentally or defined by experience:

$$Torque_{real} = \eta \times Torque_{ideal}.$$

Calculating the torque as described above does not take into account some real effects that allow a more precise estimate of the real torque developed by the actuator device 1 when operated to carry out an emergency maneuver.

For example, calculating the "Gain" parameter indicated above is based on the assumption that the force resulting from the contact between the pin 12 and the slot 11 is only dependent on the profile curve (see, in this regard, the aforementioned European patent EP 3 029 338 B1 owned by the same Applicant) understood as a set of positions that the center of the pin 12 assumes for each value of the angular position θ of the actuator arm 10. The geometry (in the plane) of the pin 12, which can generate actual contact points different from the theoretical ones, is not considered. The actual contact points may also depend on the deformation state of the components of interest (and, therefore, on the forces exchanged and, in cascade, on the operating conditions of the actuator 1). Still, it is not considered that the deformation state of the components (for example, of the pin 12, of the block 13, and of the actuator arm 10) leads to a variation of the value of the geometric arm Arm, and therefore of the developed torque.

Other real effects not considered in the above model concern estimating the efficiency coefficient n, for which an estimate of the effective dissipations, or rather, of the friction dissipations at the sliding surfaces, which are produced by the real contact pressures is preferable. The real contact pressures are influenced by the actual deformation/operating conditions of the actuator 1. It is also appropriate to consider other possible sources of loss of performance, for example possible variations in the rigidity of the spring 18 and/or leaks of the piston seal elements 7 due to wear.

Therefore, the predictive mathematical model can be developed in order to represent the operation of the actuator 1 in the most realistic way possible, and to estimate the performance of the actuator 1 as the operating conditions vary, and not just variation of the geometric and/or kinematic parameters.

According to the invention, the mathematical model allows an estimate of the real torque $Torque_{real}$, which can be a function not only of the pressure in the fluid cylinder 6 and of the angular position θ of the actuator arm 10, but also of other parameters such as, for example, the linear position of the actuator rod 8, the temperature in the fluid cylinder 6 and/or in the spring container unit 14, the deformation of one or more components of the actuator, and possibly other operating parameters of the actuator 1.

Therefore, the monitoring system according to the invention includes a plurality of sensors that measure some parameters indicative of the operating conditions of the actuator 1, useful for estimating the actual torque $Torque_{real}$.

In particular, the mathematical model is based on a lumped-parameter model wherein the mathematical laws that govern the operation of the actuator device 1 and its electro-pneumatic control unit 54 are represented. The lumped-parameter model is fed with information derived from simulations with specific software, for example, information obtained through finite element analysis (FEM) or Computational Fluid Dynamics (CFD) analyses of one or more components of the actuator 1. These simulations allow representation, and the capacity to numerically solve some three-dimensional phenomena such as stresses, deformations, distribution of contact pressure, etc.

The data provided by the software simulations (FEM and/or CFD) are processed in order to integrate them into the lumped-parameter model, for example, by generating interpolation curves, characterization matrices and transfer functions to be integrated into the lumped-parameter model.

The predictive mathematical model according to the invention therefore allows determination of a "transfer function" between a certain number of operating parameters of the actuator 1 (for example, pressure in the cylinder 6, temperature in the cylinder 6, thrust provided by the spring 18, angular position of the actuator arm 10, etc.) and the performance of the actuator 1, in terms of the torque that can be delivered during an emergency maneuver.

As previously described, a diagnostic procedure carried out by means of a monitoring system according to the present invention therefore envisages a controlled micro-movement of the actuator device 1, such as not to substantially entail any alteration of the process, but sufficient to bring the valve into a condition of only incipient movement.

The mathematical model of the actuator 1 stored in the processing and control unit 50 allows correlating the values of the operating parameters detected during this partial non-interfering micro-movement with those that it is estimated the actuator 1 would have during hypothetical execution of an emergency function. The mathematical model therefore allows estimating the real torque that the actuator 1 would be able to deliver during an emergency maneuver according to these estimated values of the operating parameters.

As anticipated, the example described here of a so-called "quarter turn" actuator device (i.e., an actuator device configured to transform a linear movement of the actuator rod 8 into a rotary movement of the actuator shaft 5 in order to rotate a valve member associated therewith) is not to be understood as limiting of the embodiments of the present invention. In fact, various embodiments can be equally applied to so-called "linear" actuator devices, in which the linear movement of the actuator rod 8 is directly transmitted to the movable member of a gate valve in order to make it move—indeed linearly, i.e., by means of a translation—from a first position to a second position.

Of course, without prejudice to the principle of the invention, the details of construction and the embodiments may vary widely with respect to those described and illustrated purely by way of example, without departing from the scope of the present invention.

The invention claimed is:

1. A monitoring system for an on/off actuator device for activating a valve for fluid pipelines,
said actuator device being configured for moving a valve member of said valve between a first position corresponding to a normal operating condition of the valve and a second position corresponding to an emergency operating condition of the valve, said actuator device comprising at least one fluid cylinder configured to drive a linear movement of an actuator rod,
wherein said monitoring system comprises a plurality of sensors mounted on the actuator device and configured to detect a plurality of operating parameters of the actuator device,
characterized in that said plurality of sensors comprises:
at least one pressure sensor for detecting the pressure in the fluid cylinder,
a temperature sensor for detecting the temperature in the fluid cylinder,
a linear position sensor for detecting the linear position of the actuator rod, and
one or more deformation sensors of one or more components of the actuator,
and in that said monitoring system comprises an electronic processing and control unit configured for:
activating said actuator device to impart a micro-movement of the valve member,
detecting, via said plurality of sensors, signals indicative of the values of said operating parameters during said micro-movement of the valve member, and
as a function of the values of said operating parameters detected during said micro-movement of the valve member, estimating whether said actuator device is capable of applying a torque or force value sufficient to make said valve member perform the entire movement from the first position to the second position,
said micro-movement being such as to constitute only the start of movement of the movable member of the valve, corresponding only to the overcoming of mechanical clearances and dissipative and deformation effects internal to the actuator, and furthermore being such as not to substantially involve any alteration in the flow of fluid controlled by the valve, and
said steps of detecting the sensor signals and estimating the torque or force value applicable by the actuator device being automatically activated immediately following the execution of said micro-movement;
wherein said electronic processing and control unit is configured for:
calculating an applicable torque or force value, which the actuator device is able to apply to the valve member in case the actuator device is controlled to make the valve member perform the entire movement from the first position to second position,
calculating a resisting torque or force value, which is required for the actual movement of the valve member from the first position to the second position,
comparing said applicable torque or force value to a minimum reference value, and/or comparing said resisting torque or force value to a maximum reference value,
generating a signal indicative of anomaly of the actuator device if said applicable torque or force value is lower than said minimum reference value, and
generating a signal indicative of anomaly of the valve if said resisting torque or force value is higher than said maximum reference value.

2. The monitoring system according to claim 1, wherein said electronic processing and control unit is further configured to estimate, according to the values of said operating parameters detected during said micro-movement of the valve member, the time necessary for said valve member to complete the entire movement from the first position to the second position.

3. The monitoring system according to claim 1, wherein:
said actuator device is configured for rotating said valve member of said valve between said first position and said second position,
said actuator device comprises an actuator shaft for driving the rotation of said valve member between said first position and said second position, and a transmission for transforming a linear movement of said actuator rod into a rotation of said actuator shaft, and
said plurality of sensors comprises an angular position sensor to detect the angular position of the actuator shaft.

4. The monitoring system according to claim 1, wherein said electronic processing and control unit is configured for identifying, as a result of said applicable torque or force value being lower than said minimum reference value, at least one component or sub-unit of said actuator device due to which said applicable torque or force value is lower than said minimum reference value.

5. The monitoring system according to claim 4, wherein:
an electro-pneumatic control unit is associated with said actuator device, and
said electronic processing and control unit is configured for identifying, as a result of said applicable torque or force value being lower than said minimum reference value, at least one component or sub-unit of said electro-pneumatic control unit due to which said applicable torque or force value is lower than said minimum reference value.

6. The monitoring system according to claim 1, wherein:
said normal operating condition of the valve corresponds to an opened condition of the valve and said emergency operating condition of the valve corresponds to a closed condition of the valve,
said at least one fluid cylinder is a single-acting fluid cylinder, which is normally active for holding the valve member in its first position,
the actuator device further comprises at least one spring coupled to the actuator rod and tending to rotate the valve member towards its second position, so that closing of the valve in an emergency condition is obtained by de-activating said fluid cylinder, and
said plurality of sensors comprises at least one of a temperature sensor for detecting the temperature at said spring, and a load cell sensor for detecting a force exerted by said spring on the actuator rod.

7. The monitoring system according to claim 1, wherein said at least one fluid cylinder is a double-acting cylinder activatable in a direction to move the valve member towards the first position and in an opposite direction to move the valve member towards the second position.

8. The monitoring system according to claim 1, wherein said at least one fluid cylinder comprises a first single-acting cylinder activatable to move the valve member towards the first position, and a second single-acting cylinder activatable to move the valve member towards the second position.

9. The monitoring system according to claim 1, comprising an interface panel mounted on the actuator device and configured for:
communicating the values of said detected operating parameters,
providing a command for activating said actuator device for causing a micro-movement to the valve member, and
communicating an alert message in case the actuator device is not able to apply to the valve member said value of torque or force sufficient to make the valve member perform the entire movement from the first position to the second position.

10. The monitoring system according to claim 1, comprising a remote interface panel, connected to the actuator device by means of a wired or wireless communication line, and configured for:
communicating the values of said detected operating parameters,
providing a command for activating said actuator device for causing a micro-movement to the valve member, and
communicating an alert message in case the actuator device is not able to apply to the valve member said value of torque or force sufficient to make the valve member perform the entire movement from the first position to the second position.

11. The monitoring system according to claim 1, wherein said electronic processing and control unit is mounted on board the actuator device.

12. The monitoring system according to claim 1, wherein:
said electronic processing and control unit is located in a remote control station and connected to the actuator device by means of a wired or wireless communication line,
the sensors in said plurality of sensors mounted on the actuator device transmit signals indicative of the values of said operating parameters of the actuator device to said electronic processing and control unit), and
said electronic processing and control unit transmits command signals to said actuator device for its activation.

13. The monitoring system according to claim 12, wherein said electronic processing and control unit is connected to a plurality of actuator devices of the on/off type for activating respective valves for fluid pipelines and is configured for:
activating said actuator devices to impart micro-movements to the respective valve members,
detecting, by the respective plurality of sensors, respective signals indicative of the values of said operating parameters during the micro movements of the respective valve members, and
as a function of the values of the respective operating parameters detected during the micro-movements of the respective valve members, estimating whether said actuator devices are capable of applying respective torque or force values sufficient to make the respective valve members complete the entire movement from the first position to the second position.

14. An actuator device of the on/off type for activating a valve for fluid pipelines, further comprising the monitoring system according to claim 1,
said actuator device being configured for moving a valve member of said valve between a first position corresponding to a normal operating condition of the valve and a second position corresponding to an emergency operating condition of the valve, and
said actuator device comprising at least one fluid cylinder configured for controlling a linear movement of an actuator rod.

15. A method for monitoring, during operation, the state of health of an on/off type actuator device for activating a valve for fluid pipelines by the monitoring system according to claim 1, said method comprising:
activating said actuator device to cause a micro movement of the valve member,
detecting, via said plurality of sensors, signals indicative of the values of said operating parameters during said micro-movement of the valve member, and
as a function of the values of said operating parameters detected during said micro-movement of the valve member, estimating whether said actuator device is capable of applying a torque or force value sufficient to make the valve member perform the entire movement from the first position to the second position,
wherein said micro-movement is such as to constitute only the start of movement of the movable member of the valve, corresponding only to the overcoming of mechanical clearances and dissipative and deformation effects internal to the actuator, and furthermore is such as not to substantially involve any alteration in the flow of fluid controlled by the valve, and
wherein said steps of detecting the sensor signals and estimating the torque or force value applicable by the actuator device are automatically activated immediately following the execution of said micro movement.

16. A monitoring system for an on/off actuator device for activating a valve for fluid pipelines,
said actuator device being configured for moving a valve member of said valve between a first position corresponding to a normal operating condition of the valve and a second position corresponding to an emergency operating condition of the valve, said actuator device comprising at least one fluid cylinder configured to drive a linear movement of an actuator rod, wherein said monitoring system comprises a plurality of sensors mounted on the actuator device and configured to detect a plurality of operating parameters of the actuator device, characterized in that said plurality of sensors comprises:
at least one pressure sensor for detecting the pressure in the fluid cylinder,
a temperature sensor for detecting the temperature in the fluid cylinder,
a linear position sensor for detecting the linear position of the actuator rod, and
one or more deformation sensors of one or more components of the actuator, and in that said monitoring system comprises an electronic processing and control unit configured for:
activating said actuator device to impart a micro-movement of the valve member,
detecting, via said plurality of sensors, signals indicative of the values of said operating parameters during said micro-movement of the valve member, and
as a function of the values of said operating parameters detected during said micro-movement of the valve member, estimating whether said actuator device is capable of applying a torque or force value sufficient to make said valve member perform the entire movement from the first position to the second position, said micro-movement being such as to constitute only the start of movement of the movable member of the valve, corresponding only to the overcoming of mechanical clearances and dissipative and deformation effects internal to the actuator, and furthermore being such as not to substantially involve any alteration in the flow of fluid controlled by the valve, and said steps of detecting the sensor signals and estimating the torque or force value applicable by the actuator device being automatically activated immediately following the execution of said micro-movement;

wherein:
said actuator device is configured for rotating said valve member of said valve between said first position and said second position,
said actuator device comprises an actuator shaft for driving the rotation of said valve member between said first position and said second position, and a transmission for transforming a linear movement of said actuator rod into a rotation of said actuator shaft, and
said plurality of sensors comprises an angular position sensor to detect the angular position of the actuator shaft.

17. A monitoring system for an on/off actuator device for activating a valve for fluid pipelines,
said actuator device being configured for moving a valve member of said valve between a first position corresponding to a normal operating condition of the valve and a second position corresponding to an emergency operating condition of the valve, said actuator device comprising at least one fluid cylinder configured to drive a linear movement of an actuator rod,
wherein said monitoring system comprises a plurality of sensors mounted on the actuator device and configured to detect a plurality of operating parameters of the actuator device,
characterized in that said plurality of sensors comprises:
at least one pressure sensor for detecting the pressure in the fluid cylinder,
a temperature sensor for detecting the temperature in the fluid cylinder,
a linear position sensor for detecting the linear position of the actuator rod, and
one or more deformation sensors of one or more components of the actuator, and in that said monitoring system comprises an electronic processing and control unit configured for:
activating said actuator device to impart a micro-movement of the valve member,
detecting, via said plurality of sensors, signals indicative of the values of said operating parameters during said micro-movement of the valve member, and
as a function of the values of said operating parameters detected during said micro-movement of the valve member, estimating whether said actuator device is capable of applying a torque or force value sufficient to make said valve member perform the entire movement from the first position to the second position, said micro-movement being such as to constitute only the start of movement of the movable member of the valve, corresponding only to the overcoming of mechanical clearances and dissipative and deformation effects internal to the actuator, and furthermore being such as not to substantially involve any alteration in the flow of fluid controlled by the valve, and said steps of detecting the sensor signals and estimating the torque or force value applicable by the actuator device being automatically activated immediately following the execution of said micro-movement;

wherein:
said normal operating condition of the valve corresponds to an opened condition of the valve and said emergency operating condition of the valve corresponds to a closed condition of the valve,
said at least one fluid cylinder is a single-acting fluid cylinder, which is normally active for holding the valve member in its first position,
the actuator device further comprises at least one spring coupled to the actuator rod and tending to rotate the valve member towards its second position, so that closing of the valve in an emergency condition is obtained by de-activating said fluid cylinder, and
said plurality of sensors comprises at least one of a temperature sensor for detecting the temperature at said spring, and a load cell sensor for detecting a force exerted by said spring on the actuator rod.

18. A monitoring system for an on/off actuator device for activating a valve for fluid pipelines,
said actuator device being configured for moving a valve member of said valve between a first position corresponding to a normal operating condition of the valve and a second position corresponding to an emergency operating condition of the valve, said actuator device comprising at least one fluid cylinder configured to drive a linear movement of an actuator rod,
wherein said monitoring system comprises a plurality of sensors mounted on the actuator device and configured to detect a plurality of operating parameters of the actuator device,
characterized in that said plurality of sensors comprises:
at least one pressure sensor for detecting the pressure in the fluid cylinder,
a temperature sensor for detecting the temperature in the fluid cylinder,
a linear position sensor for detecting the linear position of the actuator rod, and one or more deformation sensors of one or more components of the actuator, and in that said monitoring system comprises an electronic processing and control unit configured for:

activating said actuator device to impart a micro-movement of the valve member, detecting, via said plurality of sensors, signals indicative of the values of said operating parameters during said micro-movement of the valve member, and as a function of the values of said operating parameters detected during said micro-movement of the valve member, estimating whether said actuator device is capable of applying a torque or force value sufficient to make said valve member perform the entire movement from the first position to the second position, said micro-movement being such as to constitute only the start of movement of the movable member of the valve, corresponding only to the overcoming of mechanical clearances and dissipative and deformation effects internal to the actuator, and furthermore being such as not to substantially involve any alteration in the flow of fluid controlled by the valve, and said steps of detecting the sensor signals and estimating the torque or force value applicable by the actuator device being automatically activated immediately following the execution of said micro-movement;

wherein:
said electronic processing and control unit is located in a remote control station and connected to the actuator device by means of a wired or wireless communication line, the sensors in said plurality of sensors mounted on the actuator device transmit signals indicative of the values of said operating parameters of the actuator device to said electronic processing and control unit, and said electronic processing and control unit transmits command signals to said actuator device for its activation;

said electronic processing and control unit is connected to a plurality of actuator devices of the on/off type for activating respective valves for fluid pipelines and is configured for:

activating said actuator devices to impart micro-movements to the respective valve members, detecting, by the respective plurality of sensors, respective signals indicative of the values of said operating parameters during the micro movements of the respective valve members, and as a function of the values of the respective operating parameters detected during the micro-movements of the respective valve members, estimating whether said actuator devices are capable of applying respective torque or force values sufficient to make the respective valve members complete the entire movement from the first position to the second position.

* * * * *